United States Patent Office 3,268,325
Patented August 23, 1966

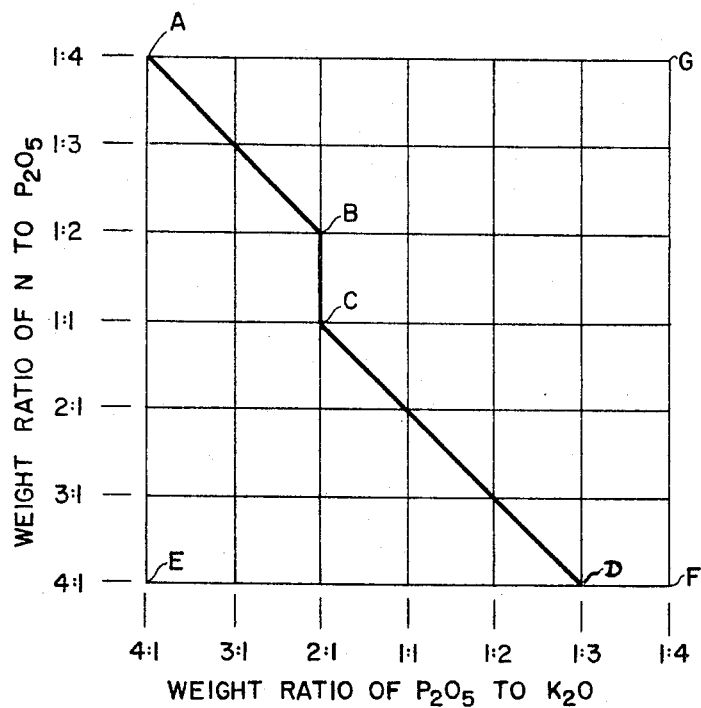

3,268,325
METHOD OF PREPARING SOLID HOMOGENEOUS FERTILIZER MIXTURE OF NITROGEN, PHOSPHORUS AND POTASSIUM VALUES
John E. Lyon, Florissant, Mo., assignor to Monsanto Company, St. Louis, Mo., a corporation of Delaware
Filed Oct. 30, 1961, Ser. No. 148,329
6 Claims. (Cl. 71—39)

This invention relates to fertilizers and more particularly to homogeneous mixed fertilizers in pellet or prill form.

Mixed fertilizers containing significant amounts of nitrogen, phosphorus and potassium are presently available in liquid form and as physical heterogeneous blends. While such fertilizers in liquid form are uniform in composition and not susceptible to segregation, they are beset with inherent disadvantages. For example, special techniques for handling and application of these materials are required because of their physical form and corrosive nature. Also, since they require significant amounts of water to insure stable solution, freight charges are appreciably higher than for an equivalent amount of a solid product.

Solid fertilizer compositions containing nitrogen, phosphorus and potassium values are traditionally sold as a heterogeneous mixture of various components such as ammonium nitrate particles, inorganic phosphate particles, potassium chloride particles, sodium nitrate particles, ammonium sulfate particles, urea particles and the like. Compositions of this type are obviously susceptible to segregation and resultant non-uniformity, and are often objectionably dusty. In addition when broadcast from conventional rotary spreaders operating in a horizontal plane, even uniform physical mixtures cannot be evenly distributed because of variations in density and size of the dissimilar constituents in the mix.

Recently attempts have been made to eliminate the more objectionable features of such solid fertilizer mixes by prilling slurries of potassium chloride in a molten mixture of ammonium nitrate and an inorganic phosphate. Although this procedure provides intimate contact between the components, it does not obviate the disadvantages inherent to granular fertilizers. Because of its high melting point and insolubility, the potassium chloride remains as solid discrete particles throughout the operation. Thus the homogeneity of the resultant product can be no better than that of the slurry prior to prilling. The maintenance of the chloride in solid form precludes the formation of any prills or pellets having uniformly distributed values. Likewise the presence of solid potassium chloride particles greatly reduces the normal spheroidizing tendency of the melt in free fall. Thus material prepared in this manner is definitely lacking in sphericity as well as in handleability. Such processes involving molten ammonium nitrate in the presence of a chloride also present a definite hazard. The processing conditions required favor the formation of highly unstable nitrogen trichloride which is subject to violent decomposition.

It is therefore an object of this invention to provide new and novel fertilizer preparations and methods of preparing them. A more specific object of the present invention is to provide free flowing, permanently homogeneous fertilizers containing significant and beneficial amounts of available nitrogen, phosphorus and potassium. The present invention also has as an object a method of preparing such fertilizers.

These and other objects are accomplished in accordance with the present invention, generally speaking, by prilling the products obtained by the neutralization of phosphoric and/or nitric acids with ammonia and potassium hydroxide. More specifically this invention contemplates mixing phosphoric acid and/or nitric acid with ammonia and potassium hydroxide in an aqueous medium, reducing the water content until it does not exceed about 5%, and spraying the dehydrated reaction mixture to provide homogeneous substantially spherical prills or pellets. When a fertilizer with a relatively high nitrogen content is required, both phosphoric acid and nitric acid are employed. However, when a relatively low nitrogen content fertilizer is being prepared, phosphoric acid alone is generally used to neutralize the potassium hydroxide and ammonia. In some instances, mixes having the same fertilizer value can be prepared by increasing the amount of ammonia while reducing or eliminating the amount of nitric acid introduced into the reaction mixture. When this is done, the added advantage of reducing the water content of the initial neutralization mixture is realized. While potassium hydroxide is a preferred reactant, it will be readily appreciated that other sources of potassium, such as potassium carbonate and the like, can be used with equal facility.

Alternately, the molten mixture to be sprayed can be prepared directly from the neutralization products of the above reactants. Thus, molten mixtures containing the requisite nitrogen, phosphorus and potassium values can be made directly from dry, solid mixtures of ammonium nitrate, potassium nitrate, the mono-, di-, and tri-phosphates of potassium, the mono- and di-phosphates of ammonia, mixed phosphates of potassium and ammonia and the like.

It has been found, however, that the solubility of potassium values in molten mixtures of ammonium and phosphorus salts is definitely limited at temperatures below the decomposition temperature of such salts, and particularly below the decomposition point of ammonium nitrate. Since the melting points of potassium salts such as the nitrate and phosphates are well above the melting points of the corresponding ammonium salts, it is necessary to rely upon the solubility of the potassium salts in the remaining components of the mixture. When an excessive proportion of potassium is present, a significant amount of it remains undissolved and in particulate form at safe operating temperatures. Thus, the proportion of potassium in relation to nitrogen and to phosphorus must be kept within well defined limits to insure the formation of the uniform prills or pellets of the present invention.

The amount of phosphorus values in the fertilizers of the present invention must also be maintained below a specific maximum which is dependent to a certain extent upon the relative proportions of nitrogen and potassium present. When this operative maximum is exceeded, the temperatures normally encountered in the prilling operation convert significant amounts of the phosphate present to glassy phosphates. These polymeric phosphate glasses seriously impair the efficiency of the prilling process, and in addition render the product tacky, soft and readily deformable.

The inter-dependency between the phosphorus and potassium values in fertilizers of the present invention is graphically portrayed in the attached drawing, in which the weight ratios of nitrogen (N) to phosphorus pentoxide ($P_2O_5$) are charted against the weight ratios of $P_2O_5$ to potassium oxide ($K_2O$). It has been found that free flowing, dense, hard, and relatively uniform sized prills or pellets can be readily obtained by spraying molten substantially anhydrous mixtures having fertilizer values so co-ordinated that their compositions are within area ABCDE of the drawing. Conversely, mixtures having compositions represented by points to the right of line ABCD in area ABCDFG cannot be prilled utilizing conventional methods and apparatus. Thus, when the compositions are co-ordinated to be defined by area ABCDE of the drawing, a commercially acceptable prilled product is obtained; whereas other formulations yield unacceptable products.

Since a substantially anhydrous product is desired, the water content of the molten mixture prior to prilling is preferably maintained at an absolute minimum so as to preclude the need of subsequently drying the prills or pellets by conventionally well known methods. The water content of the mixture being prilled is not permitted to exceed about 5% and is preferably maintained under about 2%.

The prills of the present invention are obtained by subjecting the molten mixture to standard prilling operations. Thus, the mixtures are forced under a low hydrostatic head through a plate at the top of the prilling tower having a plurality of orifices between about 0.015 and about 0.050 inch in diameter. The mixture in passing through these orifices form into droplets, which are then permitted to fall a distance of at least about 20 feet to the base of the prilling tower. The tower contains air or other inert gaseous cooling medium maintained at a temperature below the solidification point of the mixture.

The invention and the manner in which it accomplishes its objects will be more readily understood by reference to the following preferred embodiments thereof. The proportions given in these examples and throughout the specification are in parts by weight unless otherwise indicated.

EXAMPLE 1

About 220 parts of a 50% aqueous solution of potassium hydroxide, about 420 parts of 75% phosphoric acid and about 910 parts of 57% nitric acid are introduced into a reaction vessel, and approximately 140 parts of substantially anhydrous ammonia added thereto. This provides about 1690 parts of a 70–75% solution of the neutralization products of the reactants, a portion of the water being evaporated by the heat of reaction. This solution is then concentrated to about 95% by evaporating water therefrom at about 140–145° C. and about one-half atmosphere. The resultant solution is passed rapidly through small diameter (i.e., about 1 inch) tubes at a temperature of about 190° C., and is then flashed into a chamber maintained at a reduced pressure of about 0.15 atmosphere wherein water is vaporized from the composition to less than about 1% and preferably less than 0.5%. This concentrated molten mixture is then prilled in a conventional manner by spraying it at about 200° C. into a prilling tower in contact with ambient air, the solid fertilizer product being removed from the bottom of the tower at about 60–70° C. The product thus obtained is in the form of dense, hard, substantially spherical, relatively uniformly sized prills having an approximate analysis of 23% nitrogen, 23% $P_2O_5$ and 7% $K_2O$.

EXAMPLE 2

In this embodiment a composition having substantially the same fertilizer values as the above mixture is obtained by the neutralization of ammonia and potassium hydroxide with phosphoric acid alone. About 220 parts of a 50% aqueous solution of potassium hydroxide and about 420 parts of 75% phosphoric acid are mixed in a reaction vessel, and approximately 280 parts of substantially anhydrous ammonia added thereto. This yields about 920 parts of a reaction mixture having a concentration of about 75–80% in contrast to the 70–75% solution initially obtained in Example 1. The reaction mixture is then concentrated to at least about 99% and formed into prills as described in the preceding example.

In like manner a series of fertilizer compositions of the present invention were prepared by mixing dry salts having the requisite nitrogen, potassium and phosphorus values. In each instance the compositions were co-ordinated so as to be represented within area ABCDE of the drawing. The formulations of mixtures thus prepared are set forth in Table I together with their approximate analyses.

TABLE I

| Example No. | Parts by Weight | | | | Analysis | | |
|---|---|---|---|---|---|---|---|
| | $NH_4NO_3$ | $NH_4H_2PO_4$ | $KH_2PO_4$ | $KNO_3$ | N | $P_2O_5$ | $K_2O$ |
| 3 | 31 | 40 | 29 | | 15 | 41 | 9 |
| 4 | 46 | 29 | 25 | | 19 | 31 | 8 |
| 5 | 30 | 31 | 39 | | 14 | 40 | 13 |
| 6 | 40 | 27 | 33 | | 17 | 34 | 11 |
| 7 | 46 | 38 | | 16 | 23 | 23 | 7 |
| 8 | 73 | 12 | 15 | | 27 | 15 | 6 |
| 9 | 37 | 17 | 46 | | 15 | 35 | 16 |
| 10 | 53 | 13 | 34 | | 20 | 26 | 12 |
| 11 | 73 | 16 | | 11 | 28 | 10 | 5 |
| 12 | 55 | 18 | | 27 | 25 | 12 | 12 |
| 13 | 65 | 15 | | 20 | 27 | 9 | 9 |

Each of these compositions was heated to temperatures of approximately 200° C. and passed through orifices of about 0.03 inch in diameter and permitted to fall about 175 feet through air at a temperature of approximately 75° C. The resultant prills were then collected at the base of the tower. These prills or pellets were strong, dense, free flowing, hard, substantially spherical and of a relatively uniform size. A large percentage of them were of such a size that they passed through standard 12 mesh screen while being retained on a standard 14 mesh screen.

To illustrate the criticality of the proportions of the present invention another series of samples having formulations outside area ABCDE of the drawing were prepared. These samples together with their approximate analyses are set forth in Table II.

TABLE II

| Example No. | Parts by Weight | | | | Analysis | | |
|---|---|---|---|---|---|---|---|
| | $NH_4NO_3$ | $NH_4H_2PO_4$ | $KH_2PO_4$ | $KNO_3$ | N | $P_2O_5$ | $K_2O$ |
| 14 | 20 | 36 | 44 | | 11 | 45 | 15 |
| 15 | 30 | | 70 | | 10 | 37 | 23 |
| 16 | | 63 | | 37 | 13 | 39 | 17 |
| 17 | 22 | 33 | | 45 | 20 | 20 | 21 |
| 18 | 40 | | 60 | | 14 | 13 | 20 |
| 19 | 36 | 16 | | 48 | 22 | 10 | 22 |
| 20 | 40 | 12 | | 48 | 22 | 7 | 22 |
| 21 | 15 | | 65 | 20 | 16 | 40 | 9 |

When attempts were made to prill these compositions in the manner set forth in the preceding examples, the operations were unsuccessful. In those instances where the $K_2O$ equivalent was particularly high, the potassium salt was not completely dissolved in the molten mixture and at least a substantial amount of the salt remained as discrete particles. This definitely precluded the obtainment of homogeneous, spherical, free-flowing prills. Likewise when the $P_2O_5$ equivalent value was inordinately high, it was practically impossible to obtain a dry solid product. When the $P_2O_5$ value is at such high levels a major proportion of the phosphate salt is converted to the polymeric phosphates which remain in a semi-solid condition causing agglomeration or complete re-fusion of the prilled mixture. Thus, it is clear that the ratios of the nitrogen, $P_2O_5$ and $K_2O$ values must be maintained within area ABCDE of the drawing to achieve the beneficial results of the present invention.

The product of the present invention can be modified in many conventional ways to enhance its properties. For example, the pellets, solidified droplets, or prills can be coated or impregnated with anti-setting agents, such as Acid Magenta and the like and can also be provided with various coating agents such as diatomaceous earth, limestone, gypsum, soapstone, talc and similar materials.

While this invention has been illustrated with particular reference to various specific embodiments thereof, it will be obvious that many other variations may be made within the scope of the present invention.

The embodiments of the invention in which an exclusive property or privilege is claimed are defined as follows:

1. A method of preparing a free flowing permanently homogeneous fertilizer mixture of nitrogen, phosphorus and potassium values in the form of a plurality of substantially spherical pellets having a substantially uniform composition which comprises substantially neutralizing ammonia and a basic potassium compound selected from the group consisting of potassium hydroxide and potassium carbonate with phosphoric acid, reducing the water content of the mixture to a maximum of about 5%, the mixture having a composition within area ABCDE of the drawing, all of the components of the mixture being in the liquid state, passing the molten mixture through orifices to form a plurality of droplets, allowing said droplets to pass freely through an inert gaseous cooling medium until they are solidified, and collecting the resulting solidified droplets.

2. A method of preparing a free flowing permanently homogeneous fertilizer mixture of nitrogen, phosphorus and potassium values in the form of a plurality of substantially spherical pellets having a substantially uniform composition which comprises mixing an aqueous potassium hydroxide solution, substantially anhydrous ammonia, nitric acid and phosphoric acid, the resultant mixture having a composition represented within area ABCDE of the drawing, all of the components of the mixture being in the liquid state, reducing the water content of the mixture, while molten, to less than about 5%, passing the molten mixture through orifices to form a plurality of droplets, allowing said droplets to fall freely through an inert gaseous cooling medium until they are solidified, and collecting the resulting solidified droplets.

3. A method of preparing a free flowing permanently homogeneous fertilizer mixture of nitrogen, phosphorus and potassium values in the form of a plurality of substantially spherical pellets having a substantially uniform composition which comprises mixing at least one inorganic nitrate selected from the group consisting of ammonium nitrate and potassium nitrate with at least one inorganic phosphate selected from the group consisting of monopotassium phosphate, dipotassium phosphate, tripotassium phosphate, monoammonium phosphate, diammonium phosphate and mixed phosphates of ammonium and potassium, the mixture having a $N:P_2O_5$ ratio and a $P_2O_5:K_2O$ ratio represented within area ABCDE of the drawing, fusing and converting all components of the mixture to the liquid state, passing the molten mixture through orifices to form a plurality of droplets, allowing said droplets to fall freely through an inert gaseous cooling medium until they are solidified, and collecting the resulting solidified droplets.

4. A method of preparing a free flowing permanently homogeneous fertilizer mixture of nitrogen, phosphorus and potassium values in the form of a plurality of substantially spherical pellets having a substantially uniform composition which comprises melting all components of a mixture consisting essentially of between about 20 and about 75 parts ammonium nitrate, between about 10 and about 40 parts monoammonium phosphate, and between about 15 and about 40 parts monoammonium phosphate, the molten mixture having a composition within area ABCDE of the drawing, passing the molten mixture through orifices to form a plurality of droplets, allowing said droplets to fall freely through an inert gaseous cooling medium until they are solidified, and collecting the resulting solidified droplets.

5. A method of preparing a free flowing permanently homogeneous fertilizer mixture of nitrogen, phosphorus and potassium values in the form of a plurality of substantially spherical pellets having a substantially uniform composition which comprises melting all components of a mixture consisting essentially of between about 30 and about 75 parts ammonium nitrate, between about 15 and about 40 parts monoammonium phosphate, and between about 10 and about 30 parts potassium nitrate, the molten mixture having a composition within area ABCDE of the drawing, passing the molten mixture through orifices to form a plurality of droplets, allowing said droplets to fall freely through an inert gaseous cooling medium until they are solidified, and collecting the resulting solidified droplets.

6. A method of preparing a free flowing permanently homogeneous fertilizer mixture of nitrogen, phosphorus and potassium values in the form of a plurality of substantially spherical pellets having a substantially uniform composition which comprises substantially neutralizing in an aqueous medium ammonia and a basic potassium compound selected from the group consisting of potassium hydroxide and potassium carbonate with nitric and phosphoric acids, the mixture having a composition within area ABCDE of the drawing, all of the components of the mixture being in the liquid state, reducing the water content of the resultant mixture to a maximum of about 5% while maintaining the mixture above its melting point, passing the molten mixture through orifices to form a plurality of droplets, allowing said droplets to fall freely through an inert gaseous cooling medium until they are solidified, and collecting the resulting solidified droplets.

References Cited by the Examiner

UNITED STATES PATENTS

| | | | |
|---|---|---|---|
| 2,288,418 | 6/1942 | Partridge | 71—34 X |
| 2,893,858 | 7/1959 | MacDonald | 71—64 |
| 2,903,349 | 9/1959 | Bryant | 71—64 |
| 2,926,079 | 2/1960 | Smith | 71—64 |
| 3,048,887 | 8/1962 | Weiland | 71—64 X |
| 3,050,385 | 8/1962 | Parker | 71—64 |
| 3,114,624 | 12/1963 | Smith et al. | 71—64 |

DONALL H. SYLVESTER, *Primary Examiner.*

MAURICE A. BRINDISI, ANTHONY SCIAMANNA, *Examiners.*

H. T. CARTER, H. R. CAINE, *Assistant Examiners.*